(12) United States Patent
Douglas et al.

(10) Patent No.: US 9,871,337 B2
(45) Date of Patent: Jan. 16, 2018

(54) FEL SYSTEM WITH HOMOGENEOUS AVERAGE OUTPUT

(71) Applicant: JEFFERSON SCIENCE ASSOCIATES, LLC, Newport News, VA (US)

(72) Inventors: David R. Douglas, Yorktown, VA (US); Robert Legg, Newport News, VA (US); R. Roy Whitney, Newport News, VA (US); George Neil, Williamsburg, VA (US); Thomas Joseph Powers, Poquoson, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 46 days.

(21) Appl. No.: 14/708,259

(22) Filed: May 10, 2015

(65) Prior Publication Data

US 2015/0325975 A1    Nov. 12, 2015

Related U.S. Application Data

(60) Provisional application No. 61/991,925, filed on May 12, 2014.

(51) Int. Cl.
*H01S 3/09* (2006.01)
*H01S 3/10* (2006.01)

(52) U.S. Cl.
CPC .............. *H01S 3/0903* (2013.01); *H01S 3/10* (2013.01)

(58) Field of Classification Search
CPC ..................................................... H01S 3/0903
See application file for complete search history.

(56) References Cited

U.S. PATENT DOCUMENTS

| 7,166,973 | B1 | 1/2007 | Douglas et al. | |
|---|---|---|---|---|
| 2003/0026300 | A1* | 2/2003 | Biedron | H01S 3/0959 372/2 |
| 2006/0033417 | A1* | 2/2006 | Srinivasan-Rao | H01J 3/021 313/399 |
| 2012/0288065 | A1* | 11/2012 | Graves | H05G 2/00 378/119 |

(Continued)

OTHER PUBLICATIONS

Douglas, D., Modeling of Longitudinal Phase Space Dynamics in Energy-Recovering FEL Drivers, JLAB-TN-99-002, Jan. 14, 1999.

(Continued)

*Primary Examiner* — Marcia Golub-Miller

(57) ABSTRACT

A method of varying the output of a free electron laser (FEL) on very short time scales to produce a slightly broader, but smooth, time-averaged wavelength spectrum. The method includes injecting into an accelerator a sequence of bunch trains at phase offsets from crest. Accelerating the particles to full energy to result in distinct and independently controlled, by the choice of phase offset, phase-energy correlations or chirps on each bunch train. The earlier trains will be more strongly chirped, the later trains less chirped. For an energy recovered linac (ERL), the beam may be recirculated using a transport system with linear and nonlinear momentum compactions $M_{56}$, which are selected to compress all three bunch trains at the FEL with higher order terms managed.

1 Claim, 3 Drawing Sheets

Phase space configuration at full energy (left) and RF waveform showing chirps on bunch trains (right)

(56) References Cited

U.S. PATENT DOCUMENTS

2015/0228444 A1* 8/2015 Douglas ............... H01J 37/147
                                                250/396 R
2016/0147161 A1* 5/2016 Nikipelov ............ G02B 1/06
                                                355/67

OTHER PUBLICATIONS

Douglas, D., Longitudinal Phase Space Management in the IR Upgrade FEL Driver, JLAB-TN-00-020, Sep. 13, 2000.
Freund, Douglas, and O'Shea, Multiple Beam Free-Electron Lasers, Nuclear Instruments and Methods, A 507 (2003) 373-377).

* cited by examiner

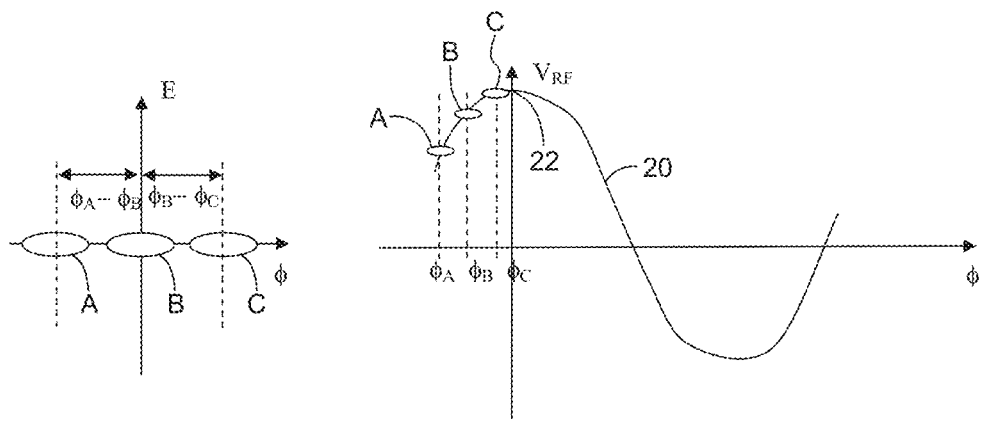
Figure 1: Injected phase spaces (left) and RF wave form configuration (right)
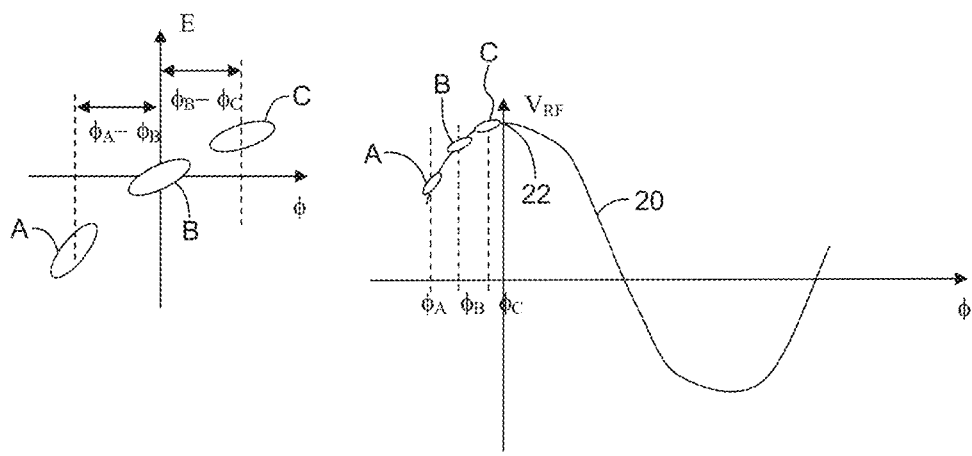
Figure 2: Phase space configuration at full energy (left) and RF waveform showing chirps on bunch trains (right)

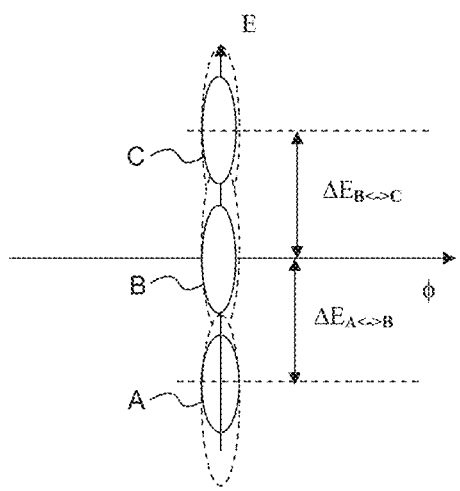
Figure 3: Phase space at delivery to FEL A showing compressed bunch trains before (solid) and after (dashed) lasing

FEL SYSTEM WITH HOMOGENEOUS AVERAGE OUTPUT

CROSS-REFERENCE TO RELATED APPLICATIONS

This application claims the priority of Provisional U.S. Patent Application Ser. No. 61/991,925 filed May 12, 2014.

GOVERNMENT LICENSE RIGHTS

This invention was made with government support under Management and Operating Contract No. DE-AC05-06OR23177 awarded by the Department of Energy. The United States Government has certain rights in the invention

FIELD OF THE INVENTION

The present invention relates to charged particle beams and more particularly to a method of varying the output of a free electron laser (FEL) on very short time scales to produce a slightly broader, but smooth, time-averaged wavelength spectrum.

BACKGROUND OF THE INVENTION

Depending on system architecture FELs typically do, on a drive-electron-bunch-by-bunch basis, produce "noisy" wavelength output, which is detrimental to the beam quality.

Accordingly, it would be desirable to reduce the "noise" and produce a slightly broader, but smooth, time-averaged wavelength spectrum.

OBJECT OF THE INVENTION

It is therefore an object of the present invention to reduce the "noise" in the wavelength output of an FEL.

A further object of the invention is to improve the beam quality of an FEL operating on a drive-electron-bunch-by-bunch basis.

A further object is to provide an FEL output beam that includes a slightly broader, smoother, time-averaged wavelength spectrum.

Yet another object of the invention is to provide a method that will, in a single beamline, provide independent control of multiple bunch trains and thereby allow rapid variation of output wavelength

BRIEF SUMMARY OF THE INVENTION

The current invention includes a method of varying the output of a free electron laser (FEL) on very short time scales to produce a slightly broader, but smooth, time-averaged wavelength spectrum. The method includes injecting into an accelerator a sequence of bunch trains at phase offsets from crest. Accelerating the particles to full energy to result in distinct and independently controlled, by the choice of phase offset, phase-energy correlations or chirps on each bunch train. The earlier trains will be more strongly chirped, the later trains less chirped. For an energy recovered linac (ERL), the beam may be recirculated using a transport system with linear and nonlinear momentum compactions $M_{56}$ and $T_{566}$, which are selected to compress all three bunch trains at the FEL with higher order terms managed.

BRIEF DESCRIPTION OF THE DRAWINGS

FIG. 1 includes plots of the injected phase spaces (left) and the RF wave form configuration (right).

FIG. 2 includes plots of the phase space configuration at full energy (left) and RF waveform showing chirps on bunch trains (right).

FIG. 3 depicts the phase space at delivery to the FEL showing compressed bunch trains before (solid) and after (dashed) lasing.

DETAILED DESCRIPTION OF THE INVENTION

Figure 4:
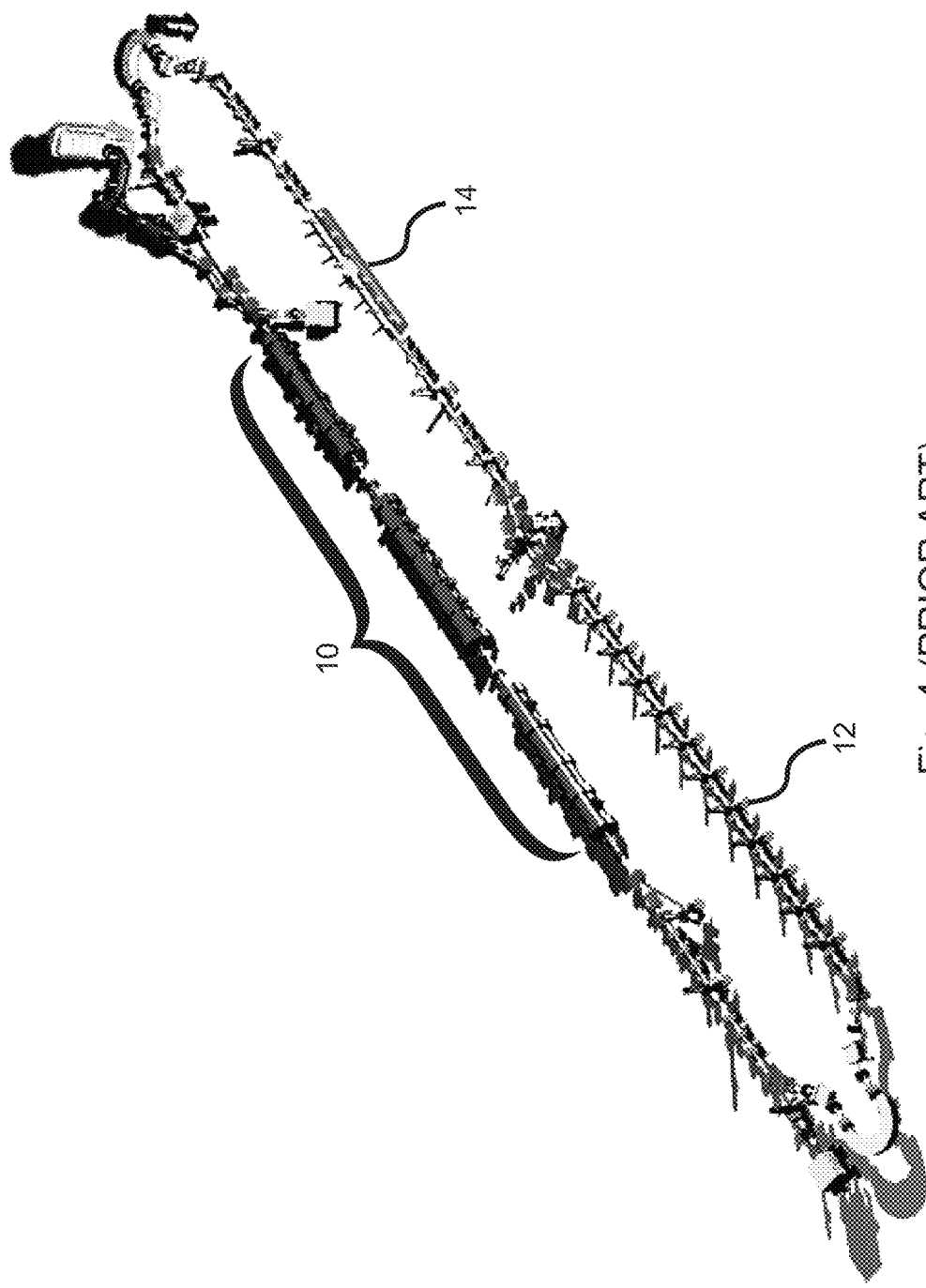
FIG. 4 depicts a prior art structure for a free electron laser (FEL) system used to achieve a homogenous average output according to the present invention.

The current invention includes a method of varying the output of a free electron laser (FEL) on very short time scales to produce a slightly broader, but smooth, time-averaged wavelength spectrum.

The meaning of terms as used herein includes:
1) The term "linac" refers to a linear accelerator, which is a straight section of a particle accelerator system in which beam energy is boosted by a chain of RF cavities. As an example, at the Continuous Electron Beam Accelerator Facility (CEBAF) in Newport News, Va., each CEBAF linac contains 160 RF cavities that can boost the beam energy by 600 MeV. The particle accelerator is the machine or equipment used to transfer kinetic energy to charged particles in order to increase the momentum of the particle.
2) The term "energy compression" is the application of RF-energy to reduce the energy spread of the beam from the linear accelerator. The benefits of the energy compression will be to lower the energy spread of the beam.
3) The term "momentum compaction" refers to the momentum dependence of the recirculation path length for an object that is bound in cyclic motion, such as in a closed orbit. The momentum compaction is used in the calculation of particle paths in circular particle accelerators.
4) The term "transport system" as used herein refers to the equipment design that uses sets of magnets in to achieve desired phase space parameters for the particle beam.
5) The term "chirped" refers to a pulsed signal in which the frequency has been increased (more chirped) or decreased (less chirped) with time. "More chirped" means that the instantaneous frequency rises with time and "less chirped" means the instantaneous frequency decreases with time.

The method will, in a single beamline, provide independent control of multiple bunch trains and thereby allow rapid variation of output wavelength. This method is based on the nonlinear longitudinal matching methods and large-acceptance beam transport systems now in use at Jefferson Lab, Newport News, Va., and is motivated by the observation that—when using these methods—very modest changes in beam energy (well under 1 MeV) can turn lasing off and on by varying compressed bunch length. This demonstrates that easily generated and managed variations in phase/energy correlation across a bunch train is an effective control for laser turn-on/off.

The method is as follows:
1. Inject into the energy recovered linac (ERL) a sequence of bunch trains (A, B, C, . . . ; A earliest in time, B following, C later still . . . ) at phase offsets $\varphi_A$, $\varphi_B$, $\varphi_C$, . . . from crest (see FIG. 1). The bunch trains, which are a bunch of electrons depicted in an ellipse in the graph, are depicted as "A", "B", and "C". The left-side of FIG. 1 plots energy (E) versus phase (φ) of the ERL and the right-side plot depicts the voltage ($V_{RF}$) versus phase (φ) of the ERL. The phase spaces between the bunch trans injected into the ERL are shown as $φ_A$-$φ_B$ and $φ_B$-$φ_C$ in the left plot. The radio frequency (RF) waveform 20 of the ERL, including a waveform crest 22, is depicted in the right plot. Injecting the electron bunches A, B, and C into the ERL at different phase spaces results in the bunch trains being at different phase offsets $φ_A$, $φ_B$, $φ_C$, . . . from crest.

2. Accelerate the bunch trains in the ERL to full energy. This will result in distinct and independently controlled (by the choice of phase offset) phase-energy correlations ("chirps") on each bunch train. (see FIG. 2). The earlier trains will be more strongly chirped, the later trains less chirped. As shown in FIG. 2, earliest bunch train A is more strongly chirped than bunch train B which in turn is more strongly chirped than bunch train C. Thus, in the right-side plot of longitudinal phase space in FIG. 2, earliest bunch train A is offset from crest 22 more than bunch train B which in turn is offset from crest 22.

3. Recirculate the beam using a transport system with linear and nonlinear momentum compactions $M_{56}$ (see equation [1] below), $T_{566}$, (and, if needed, $W_{5666}$, $U_{56666}$, . . . ) selected to compress all three bunch trains at the FEL (see FIG. 3) with higher order terms.

$$M_{56} = (\lambda_{RF}/(2\pi))(E_{full}/\Delta E_{linac})(1/\sin φ_B) \quad [1]$$

wherein:
$M_{56}$ is the momentum compaction
$\lambda_{RF}$ is the wavelength of the accelerating frequency
$E_{full}$ is the full energy spread
$E_{linac}$ is the maximum energy gain
$φ_B$ is the phase difference between the bunches 4. If applied in an Energy-Recovered Linac (ERL), recirculate all exhaust bunch trains for energy recovery, using linear and nonlinear compactions of recovery arc and energy/phase separations of bunch trains to generate energy compression during energy recovery and provide clean transport to the beam dump.

As shown in FIG. 3, the above method will produce three temporally coincident bunches at nearby—but different—energies at the FEL (see FIG. 3). Each bunch will therefore produce light of a slightly different wavelength.

With reference to FIG. 4, an exemplary structure for a free electron laser (FEL) system used to achieve a homogenous average output according to the present invention includes an energy recovered linac (ERL) 10 in which the beam is recirculated through a transport system 12 and the resulting electrons are transported to a free electron laser (FEL) 14 which produces three temporally coincident bunches at nearby—but different—energies at the FEL (see FIG. 3). Each bunch will therefore produce light of a slightly different wavelength.

By construction, the entire phase space region subtended by the three bunch trains depicted in FIG. 3 will lase, though each individual bunch train (subregion) will produce a different output wavelength, as a result of the different energy, and the individual bunch output may be "noisy" in spectrum or power. It can be smoothed by a slight alteration of the process as described thus far. Instead of injecting three individual bunch trains at slightly different phases relative to crest of the linac RF waveform, inject instead a single bunch train while varying the phase offset. In this case, the timing of individual bunches relative to the crest will vary between that of the original trains A and C; the energy will vary commensurately, and though individual bunches may produce "noisy" output, over time (10s or 100s of bunches) the average output will be smoothed.

According to another embodiment of the invention, the injection phase (output wavelength) variations can be performed on RF time scales (100s of kHz or MHz), so that the "smooth time average" will be manifested on time scales of kHz, 10s of kHz, or shorter.

Bunch trains can be parsed on energy and chirp, and can be independently controlled in phase relationship and final energy by either a) injection of the bunch trains at a single energy and acceleration at different phases to somewhat different final energies, or by b) injecting multiple energies and operating at phase separations that produce compensatory offsets of the central energies of all bunch trains—resulting in a set of bunch trains at common energy but with differing chirp. Such chirp variations can also be used to control energy extraction from individual bunches, and thereby provide an additional parameter for smoothing and broadening of the output wavelength and power.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention for various embodiments with various modifications as are suited to the particular use contemplated.

What is claimed is:

1. A method for varying the output of a free electron laser (FEL), comprising:
    providing an energy recovered linac (ERL) including a linear accelerator (linac) supplied with radio frequency (RF) energy, the RF energy including an RF waveform having a crest;
    providing a transport system for supplying a sequence of electron bunch trains to the FEL, said bunch trains including a bunch length;
    injecting into the linac a sequence of individual bunch trains of electrons at different phases relative to the crest of the linac RF waveform;
    accelerating the bunch trains in the ERL to full energy to produce distinct and independently controlled phase-energy correlations on each bunch train with earlier trains more strongly chirped and the later trains less chirped; and
    delivering the sequence of accelerated bunch trains to the FEL.

* * * * *